Patented Sept. 28, 1954

2,690,397

UNITED STATES PATENT OFFICE 2,690,397

STABILIZATION OF EDIBLE MATERIALS

Joseph A. Chenicek, Bensenville, Ill., assignor to Universal Oil Products Company, Chicago, Ill., a corporation of Delaware No Drawing. Application March 17, 1949, Serial No. 82,027

10 Claims. (Cl. 99—163)

This application is a continuation-in-part of copending application Serial No. 68,428 filed December 30, 1948.

This application relates to the stabilization of edible materials and more particularly to a novel method of preserving the desirable qualities thereof.

As hereinafter will be set forth in greater detail, various edible materials undergo undesirable oxidative deterioration in storage or during treatment. As a method of preventing or retarding this deterioration, an inhibitor is incorporated in or applied to the edible material. In many cases, the inhibitor in a water dispersible form is desired, and the present invention is directed to a novel inhibitor mixture and to the use thereof in the treatment of edible materials to retard and/or prevent said deterioration.

A particularly satisfactory inhibitor for use in the treatment of edible materials comprises a 2-alkyl-4-alkoxyphenol. The present application is directed to a water dispersible form of this type of inhibitor.

In one embodiment the present invention relates to a method of stabilizing an edible material which comprises treating the same with a mixture of a 2-alkyl-4-alkoxyphenol, an edible oil and an emulsifying agent.

In a specific embodiment the present invention relates to a method of stabilizing an edible material which comprises treating the same with a mixture of 2-tertiary-butyl-4-methoxyphenol, a vegetable oil and an emulsifying agent.

In another embodiment the present invention relates to a novel composition of matter comprising a 2-alkyl-4-alkoxyphenol, an edible oil and an emulsifying agent.

As hereinbefore set forth, a water dispersible 2-alkyl-4-alkoxyphenol is particularly desirable when treating certain edible materials to retard deterioration thereof. For example, when treating milk, fish or meat, the edible material is dipped, soaked or washed in an aqueous medium. In such cases, improved application of the inhibitor to the edible material is obtained when the inhibitor is uniformly distributed throughout the aqueous medium and thereby is uniformly applied to the edible material. The novel inhibitor mixture of the present invention is water dispersible and, therefore, will be evenly distributed throughout the aqueous medium and, as herein set forth, will be evenly applied to the edible material.

In another embodiment of the invention, when treating solid edible material, edible gels such as selected fractions of algea, gelatins, pectins, etc. may be employed in order to coat the surface of the edible material and to thereby retain the inhibitor mixture thereon. The inhibitor thus will preserve the external surface of the edible material and will penetrate into the interior thereof to also protect the remaining portions thereof.

In still another embodiment of the invention, the inhibitor mixture may be sprayed as a fog or mist over the edible material to obtain a uniform distribution of the inhibitor.

As hereinbefore set forth the novel composition of the present invention comprises a mixture of a 2-alkyl-4-alkoxyphenol, an edible oil and an emulsifying agent. The 2-alkyl-4-alkoxyphenol is represented by the following general structure:

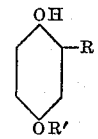

wherein R and R' are alkyl groups.

The alkyl group substituted in the ring preferably comprises a tert-alkyl group including tert-butyl, tert-amyl, tert-hexyl, tert-heptyl, tert-octyl, etc. The tert-alkyl groups are more effective in contributing to the inhibitor potency of the resultant compound. However, it is understood that in some cases other alkyl groups such as methyl, ethyl, propyl, isopropyl, n-butyl, isobutyl, sec-butyl, sec-amyl, etc. may be employed but not necessarily with equivalent results.

The alkyl group of the alkoxy substituent may comprise, for example, methyl, ethyl, propyl, isopropyl, butyl, isobutyl, sec-butyl, tert-butyl, amyl, isoamyl, sec-amyl, tert-amyl, etc., and may be the same as or different from the other alkyl substituent group. In general, it may be said that the alkoxy groups of relatively low molecular weight, comprising methoxy or ethoxy groups, appear to have the strongest influence, although the other groups have considerable value. Particularly preferred oxidation inhibitors comprise 2-tert-butyl-4-methoxy phenol and 2-tert-butyl-4-ethoxy phenol.

The inhibitor of the present invention may be prepared in any suitable manner. One particularly convenient method of preparing the inhibitor consists in alkylating a hydroquinone ether, and particularly a monoalkyl ether, with an olefin-acting substance including an olefin, alcohol, ether, etc. For example, hydroquinone monomethyl ether may be reacted at a temperature of 75° to 80° C. with a tertiary alcohol corresponding to the group to be subsituted as, for example, tertiary butyl alcohol, using 85% phosphoric acid as the catalyst. The reaction mixture is stirred continuously until the reaction is complete. The mixture is then washed with water to remove the remaining acid and is extracted with 10% sodium hydroxide solution to remove the unreacted hydroquinone ether. The insoluble portion is distilled under reduced temperature and the resulting compound may be further purified by recrystallization.

Any suitable edible oil may be used in the novel composition of the present invention and may be of mineral, animal or vegetable origin. Vegetable oils are preferred such as cotton seed oil, soy bean oil, corn oil, peanut oil, etc. The animal oils include lard, butter, etc.

Any suitable emulsifying agent which is non-toxic may be utilized in the novel composition of the present invention. Particularly suitable emulsifying agents include those derived from hexahydric alcohols by esterification and esterification-etherification. The hexahydric alcohols (hexitols) will be dehydrated to hexitans and hexides and these are esterified with any suitable organic acid such as lauric, palmitic, oleic, stearic, etc. When etherification is utilized, the ether groups may be those derived by the reaction of the free hydroxyl group or groups with ethylene oxide. Typical emulsifying agents within this group include mannitan monooleate, mannitan monolaurate, sorbitan monooleate, mannitol monooleate, mannide monooleate, sorbitan monopalmitate, polyoxyethylene sorbitan monolaurate, polyoxyethylene sorbitan monooleate, etc. Other suitable emulsifying agents may be those derived from flour, etc. Still other suitable emulsifying agents may comprise those prepared by the condensation of primary aliphatic amines with ethylene oxide. It is understood that mixtures of emulsifying agents may be employed when desired.

As hereinbefore set forth, the novel composition of the present invention is water dispersible and readily may be used in the treatment of edible materials in an aqueous medium. Further, as hereinbefore set forth, these mixtures are particularly useful in the treatment of solid edible materials including meat, fish, dairy products such as cheese, dried milk, butter, candy chocolate, etc. This mixture is also particularly useful in the treatment of edible materials in an emulsion such as milk, cheese, etc.

Another particular example of applying the novel composition of the present invention to a solid material is the treatment of crops in order to preserve the desirable qualities thereof before and after cutting. It has been found that the drying of crops either in the field or in drying equipment results in a loss of valuable food accessory factors. For example, alfalfa loses anywhere from 45% to 85% of its carotene value during the drying treatment. Similarly, carotene is found in sweet potatoes and in other yellow pigmented plants. Vitamin $B_1$ (thiamine hydrochloride) is found in various seeds, grains, nuts, legumes, fruits and vegetables, while vitamin $B_2$ (riboflavin) is found in wheat germ and leafy vegetables. Nicotinic acid (niacin) is found in wheat germ and in several green leafy vegetables, while vitamin $B_6$ (pyridoxine) is found in whole grain cereals, crude cane molasses, etc. Vitamin C (ascorbic acid) is found in citrus fruits, tomatoes, green peppers and in various other fresh fruits and vegetables, and vitamin E is found in wheat germ oil, cotton seed oil, green leafy vegetables and various grains. Vitamin $K_1$ is found in alfalfa, spinach and other green vegetables. Pantothenic acid is found in crude cane molasses and wheat germ. Several postulated vitamins which have not as yet been completely accepted, such as citrin, gizzard erosion factor, etc., are found in various crops, the citrin being present in citrus foods, and the gizzard erosion factor being present in alfalfa, kale, etc. It is understood that the above is merely a brief reference to the vitamin content of various crops and that these and other crops may also contain other vitamins as, for example, spinach contains vitamins A, $B_2$, later known as vitamin G (riboflavin), and C, beets contain vitamin $B_1$, potatoes contain vitamin $B_2$, parsley, cabbage and berries contain vitamin C, etc.

In addition to vitamins or in absence of vitamins, various crops contain other desirable substances which tend to deteriorate due to oxidative deterioration. For example, various fatty acids, such as caprylic, capric, lauric, myristic, palmitic, stearic, oleic, linoleic, etc., are found in the oils of coconut, babassu, palm kernel, olive, castor, peanut, rapeseed, cotton seed, corn, soy bean, etc. Alcohols are found in cockfoot grass, wheat, lucerne leaf, etc. Various sterols are found in plant oils, ergosterol, for example, being found in soya bean oil. Further, crops may become rancid and lose desirable qualities such as taste, odor, retention of physical shape (non-wilting), etc., due to oxidative deterioration.

The term "crops" as used in the present invention is intended to include any substance grown from the soil to be used as a food for humans or animals, either in the form as gathered from the field or after suitable modification in form, such as by pressing, grinding, pulverizing, slurrying, making into paste, flour, etc., either used as such or after suitable cooking. Thus, the present invention is applicable to the treatment of forage crops, such as alfalfa, clover, hay, fodder, etc.; grains such as corn, wheat, oats, rice, barley, rye, soy beans, etc.; vegetables such as carrots, peas, spinach, beets, potatoes, parsley, cabbage, etc.; fruits including both small fruits and those grown on trees, such as berries, oranges, lemons, grapefruit, apples, bananas, melons, dates, figs, etc.; nut crops including peanuts, walnuts, pecans, almonds, chestnuts, hazel nuts, etc.; hops, coffee, tea, sugar crops, etc. Also included are crops such as tobacco, which although not actually consumed as such, are chewed and the oils therefrom are allowed to enter into the system. It is understood that the above crops are merely typical representatives and that the broad scope of the present invention is not intended to be unduly limited to the crops specifically mentioned, but is to include all other crops subject to oxidative deterioration.

In another embodiment of the invention the novel inhibitor composition may be utilized to stabilize edible oils and fats, which generally are of animal and vegetable origin. Merely as typical representatives, the following are mentioned: linseed oil, menhaden oil, cod liver oil, castor oil, olive oil, rapeseed oil, coconut oil, palm oil, corn oil, sesame oil, peanut oil, babassu oil, butter, fat, lard, beef tallow, etc., as well as hydrogenated oils and fats such as are sold under various trade. It is understood that other oils and fats may be treated within the scope of the present invention, including oils and fats which have previously been subjected to various treatments, such as blowing with air, heat treatment, etc.

Many compounds are known which will prevent the development of rancidity in edible oils and fats but practically all of them are unsuitable because they are either toxic and therefore cannot be used for stabilizing the edible oils and fats, or else they impart bad odor and taste to such oils and fats. Some of these compounds are so volatile they are removed from the oils and fats during cooking or in deep fat frying, while others are relatively insoluble in oils and fats.

A very important factor in an inhibitor to be used in the stabilization of oils and fats is that the inhibitor carries over into the bakery products. Many bakery products as, for example, crackers, are kept for considerable periods of time in factories, stores or in the homes before consumption. These bakery goods tend to become rancid due to these long periods of storage. While some of the known inhibitors are very potent when used in edible oils and fats, they do not have this important property of carrying over into the baked goods and therefore are not completely satisfactory for the purpose intended.

The 2-alkyl-4-alkoxyphenols of the present invention are very potent oxidation inhibitors. Another important feature of these inhibitors is that they are non-toxic and, therefore, may be used without harmful results. Still another important feature of these inhibitors is that they have the peculiar property of withstanding high temperatures and, therefore, their effectiveness is not destroyed during subsequent drying and cooking. Still another important feature of these inhibitors is that they have the property of carrying over into the finished cooked products and, therefore, will stabilize the products after cooking.

The amounts of inhibitor, edible oil and emulsifying agent to be used may vary over rather wide ranges depending upon the particular edible material to be stabilized. In general, the amount of inhibitor will be between about 1 to about 50% by weight of the mixture, the oil between about 5 to about 50% by weight of the mixture, and the emulsifying agent between about 1 to about 40% by weight of the mixture.

When the inhibitor composition is to be used for the treatment of crops, this is readily accomplished by spraying the inhibitor composition as an emulsion in water over the crops. This method has the advantage that the amount of inhibitor to be employed may be closely controlled in order to obtain even distribution thereof over the crops. It is understood that other suitable methods of applying the inhibitor to crops may be employed, such as those in which the inhibitor composition is released from a zone of high pressure in the form of a fog or mist.

In some cases better results are obtained when the emulsion and crops are heated to a temperature of from about 200° to about 500° F. for a period of from 10 seconds to 1 hour or thereabouts. However, it is understood that, when the inhibitor composition is applied to crops standing in the field, it is generally impractical if not impossible to heat the mixture. However, when the inhibitor is applied to the crops after cutting, the heating may be accomplished in driers or by other suitable means. Alfalfa, for example, is usually subjected to a drying treatment and this drying treatment may also serve to effect the desired heating for improved results of the emulsion.

The inhibitor composition may be sprayed on the crops by hand or from airplanes or by any other suitable method in order to distribute the inhibitor evenly over the crops. The inhibitor will penetrate throughout and within the leaves, seed, etc., of the crops and will thereby serve to preserve the desirable qualities, not only of the leaves themselves, but also of the oils and the like obtained from the crops. Similarly, the inhibitor will penetrate into the larger produce such as oranges, lemons, melons, apples, pears, etc., and thereby will serve to preserve the vitamin content and other desirable properties thereof.

As hereinbefore set forth, a preferred method of applying the inhibitor composition to solid edible materials is by spraying. However, it is understood that other suitable methods may be employed such as dipping or soaking the edible materials in the inhibitor composition. As hereinbefore set forth, in some cases a colloid which forms a gel-like structure may be included in the inhibitor composition in order to form a surface coating for the solid material dipped or soaked therein. In addition the cut crops, including fruit, vegetable, meat, fish, etc,. either before or after cooking, baking, smoking, etc., may be treated in this manner. For example, smoked sausage or other smoked meats, fillet of fish, smoked fish, etc. which deteriorates in storage may be treated in this manner.

When the inhibitor composition is to be used in edible oils, it may be added in any suitable manner. In general, the inhibitor composition is used in oils and fats in amounts of less than 1% by weight and generally below about 0.1% based on the 2-alkyl-4-alkoxyphenol. In most instances the amount thereof will be within the range of from about 0.0001% to about 0.01%. It is understood that the inhibitor composition of the present invention also may be used in conjunction with other oxidation inhibitors, synergists, or other additives to be incorporated in edible materials.

The following example is introduced to illustrate further the novelty and utility of the present invention but not with the intention of unduly limiting the same.

A water dispersible inhibitor composition was prepared having the following composition.

| Component: | Percent by weight |
|---|---|
| 2-tert-butyl-4-methoxyphenol | 36.5 |
| Peanut oil | 36.5 |
| Mannitan monooleate | 27.0 |

This composition was readily dispersible in water and, when used for the stabilization of edible materials, will serve to retard the oxidative deterioration thereof.

I claim as my invention:

1. A method of stabilizing an edible material subject to oxidative deterioration which comprises treating the same with an aqueous dispersion of a mixture of a 2-tert-alkyl-4-alkoxyphenol, an edible oil and a non-toxic emulsifying agent.

2. A method of stabilizing an edible material subject to oxidative deterioration which comprises treating the same with an aqueous dispersion of a mixture of 2-tert-butyl-4-methoxyphenol, vegetable oil and a non-toxic emulsifying agent.

3. A method of stabilizing an edible material subject to oxidative deterioration which comprises treating the same with an aqueous dispersion of a mixture of 2-tert-butyl-4-methoxyphenol, vegetable oil and a non-toxic emulsifying agent comprising an esterified hexahydric alcohol.

4. A method of stabilizing an edible material subject to oxidative deterioration which comprises contacting the edible material with an emulsion of a 2-tert-alkyl-4-alkoxyphenol, an edible oil, a non-toxic emulsifying agent and water.

5. An edible material subject to oxidative deterioration to which has been applied an aqueous dispersion of a mixture of a 2-tert-alkyl-4-alkoxyphenol, an edible oil and a non-toxic emulsifying agent.

6. An edible material subject to oxidative deterioration to which has been applied an aqueous dispersion of a mixture of 2-tert-butyl-4-methoxyphenol, vegetable oil and a non-toxic emulsifying agent.

7. An edible material subject to oxidative deterioration to which has been applied an aqueous dispersion of a mixture of 2-tert-butyl-4-methoxyphenol, a vegetable oil and mannitan monolaurate.

8. A novel composition of matter comprising a water-dispersible mixture of a 2-tert-alkyl-4-alkoxyphenol, an edible oil and a non-toxic emulsifying agent.

9. A novel composition of matter comprising a water-dispersible mixture of 2-tert-alkyl-4-alkoxyphenol, an edible oil and a non-toxic emulsifying agent comprising an esterified hexahydric alcohol.

10. A novel composition of matter comprising a water-dispersible mixture of 2-tert-butyl-4-methoxyphenol, a vegetable oil and mannitan monolaurate.

References Cited in the file of this patent

UNITED STATES PATENTS

| Number | Name | Date |
|---|---|---|
| 1,871,927 | Sullivan | Aug. 16, 1932 |
| 2,377,610 | Brown | June 5, 1945 |
| 2,526,865 | Gyorgy | Oct. 24, 1950 |